(12) United States Patent
Han

(10) Patent No.: US 11,489,361 B2
(45) Date of Patent: Nov. 1, 2022

(54) STANDBY POWER HARVESTING CIRCUIT FOR POWER SUPPLY UNIT

(71) Applicant: Arista Networks, Inc., Santa Clara, CA (US)

(72) Inventor: Xiaoping Han, Milpitas, CA (US)

(73) Assignee: ARISTA NETWORKS, INC., Santa Clara, CA (US)

( * ) Notice: Subject to any disclaimer, the term of this patent is extended or adjusted under 35 U.S.C. 154(b) by 147 days.

(21) Appl. No.: 16/831,758

(22) Filed: Mar. 26, 2020

(65) Prior Publication Data
US 2021/0305839 A1  Sep. 30, 2021

(51) Int. Cl.
*H02J 9/00* (2006.01)
*H02J 9/06* (2006.01)

(52) U.S. Cl.
CPC .............. *H02J 9/005* (2013.01); *H02J 9/061* (2013.01)

(58) Field of Classification Search
CPC .......... H02J 9/005; H02J 9/061; H02J 50/001; H02J 7/345; Y02D 10/00; G06F 1/26; G06F 1/3203
See application file for complete search history.

(56) References Cited

U.S. PATENT DOCUMENTS

| | | | | |
|---|---|---|---|---|
| 4,968,965 A * | 11/1990 | Naitou | ................ | B60R 21/0173 180/272 |
| 7,774,633 B1 * | 8/2010 | Harrenstien | .............. | G06F 1/24 713/323 |
| 9,312,715 B2 * | 4/2016 | Huang | ................... | H02J 7/0032 |
| 9,398,174 B2 * | 7/2016 | Ghimire | ............. | H04N 1/00188 |
| 2014/0240744 A1 * | 8/2014 | Ghimire | ............. | H04N 1/00127 358/1.13 |

* cited by examiner

*Primary Examiner* — Brian T Misiura
(74) *Attorney, Agent, or Firm* — Fountainhead Law Group P.C.

(57) ABSTRACT

The present disclosure includes a system including a power supply unit that provides an output power and a supply status indicating whether the power supply unit is receiving input power. An electronic circuit is coupled to the power supply unit to receive the output power and a standby control circuit controls turning on and off the power supply unit. A power harvesting circuit generates standby power from the supply status and provides the standby power to power the standby control circuit.

20 Claims, 4 Drawing Sheets

STANDBY POWER HARVESTING CIRCUIT FOR POWER SUPPLY UNIT

BACKGROUND

The present disclosure relates generally to power supply units, and more specifically to limiting the need for a power supply unit to provide standby power for use by other electronic components when the power supply is turned off.

Many power supply units have an ON/OFF control input that allows the power supply unit to be turned ON and OFF so long as adequate input power is supplied to the power supply unit. This ON/OFF control input may be utilized by electronic circuitry coupled to the power supply unit to turn OFF the power supply unit in various situations, such as under certain fault conditions or during a power cycling mode of control. In this situation, the electronic circuitry is powered by output power from the power supply unit when the power supply unit is turned ON. When turned OFF, the power supply unit does not provide output power to power the electronic circuitry even though circuitry within this electronic circuitry must remain functional in order to supply the ON/OFF control signal to again turn ON the power supply unit.

Some power supply units provide standby power to power this circuitry within the electronic circuitry when the power supply unit is turned OFF. The power supply unit provides the standby power so long as the power supply unit receives input power and is independent of whether the power supply unit is turned ON or OFF. In order to provide standby power, a power supply unit must include components for providing this functionality, and these components add to the cost and complexity of the power supply unit. Moreover, some power supply units do not provide standby power. While these power supply units may be less expensive, the lack of standby power limits the amount of time for which such a power supply unit may be turned OFF, and these less expensive power supply units may not be utilized in situations where a power cycling mode of control of the power supply unit is desired.

In general, it would be advantageous to be able to utilize power supply units that do not provide standby power in applications requiring the ability to turn the power supply unit ON and OFF during operation, such as in a power cycling mode of control.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

In the following description, for purposes of explanation, numerous examples and specific details are set forth in order to provide a thorough understanding of the present disclosure. It will be evident, however, to one skilled in the art that the present disclosure as expressed in the claims may include some or all of the features in these examples, alone or in combination with other features described below, and may further include modifications and equivalents of the features and concepts described herein.

Figure 1:
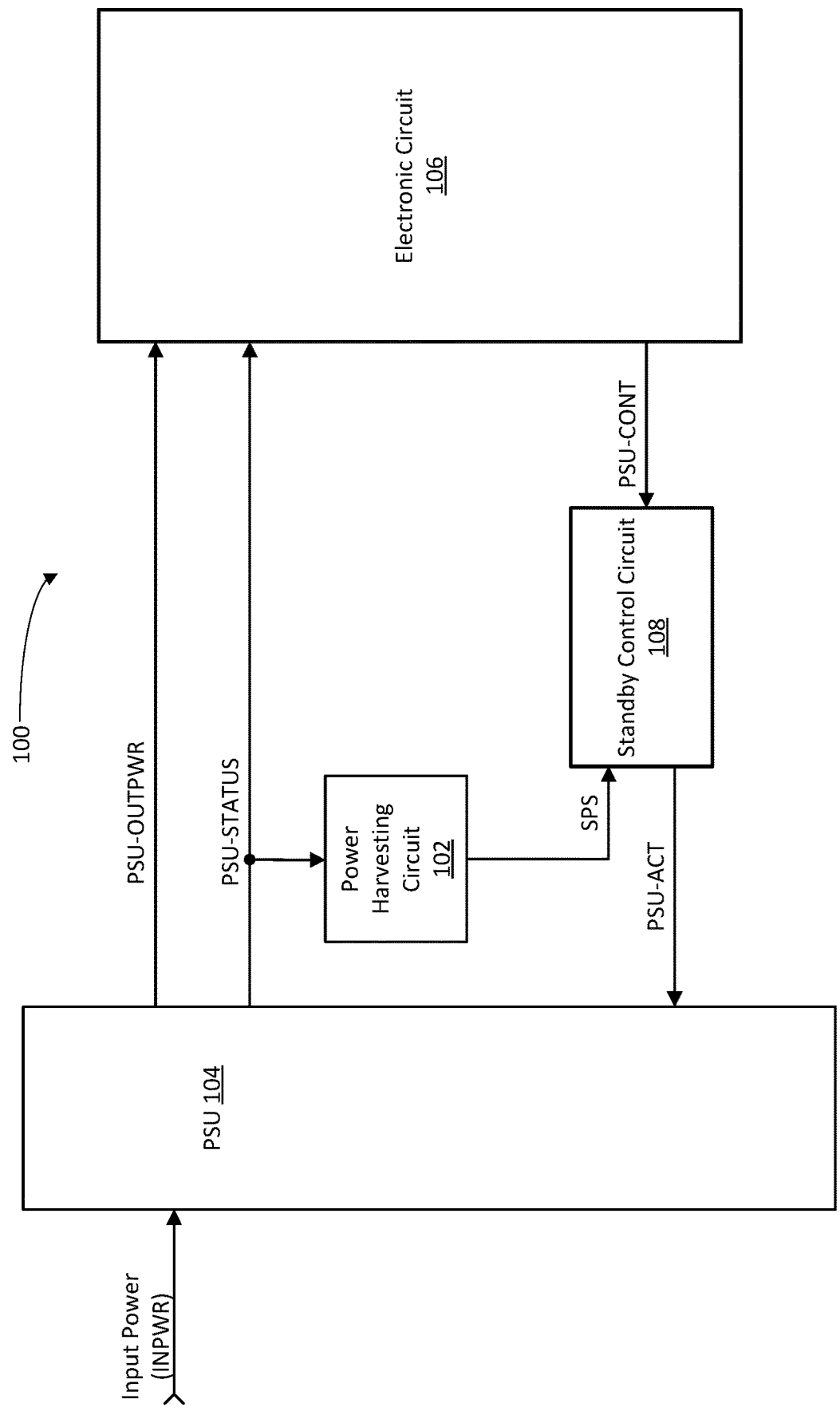
FIG. 1 is a functional block diagram of an electronic system including a standby power harvesting circuit according to an embodiment.

FIG. 1 is a functional block diagram of an electronic system 100 including a standby power harvesting circuit 102 that harvests power from a power supply status signal PSU-STATUS provided by a power supply unit 104 according to an embodiment. The power harvesting circuit 102 eliminates the need for the power supply unit 104 to provide standby power for use when the power supply unit is turned OFF, and in this way enables lower cost power supply units to be utilized in the electronic system 100, as will be described in more detail below.

In the electronic system 100, the power supply unit 104 receives input power INPWR from a suitable source such as an alternating-current (AC) power source or a direct-current (DC) power source and generates, on a power output, a DC output power PSU-OUTPWR from the input power. The power supply unit 104 may be any suitable type of power supply unit, and may be a linear power supply or a switching power supply. Typically, the input power INPWR would be an AC power source such as conventional 120 volts AC power lines, and the power supply unit 104 would be a switching power supply. An electronic circuit 106 is coupled to the power supply unit 104 to receive the DC output power PSU-OUTPWR provided by the power supply unit 104, or more specifically an output voltage and current provided by the power supply unit that correspond to output power PSU-OUTPWR. The electronic circuit 106 includes suitable circuitry (not shown) for providing desired functionality of the electronic system 100.

The power supply unit 104 also provides, on a status output, a status signal PSU-STATUS indicating whether the power supply unit is receiving input power INPWR. The PSU-STATUS signal enables a device coupled to the power supply unit 104 to determine that the power supply unit is receiving input power INPWR and operating normally. "Operating normally" or "normal operation" as used herein means as long as the power supply unit 104 receives suitable input power INPWR and is otherwise not malfunctioning during operation of the power supply unit. When the power supply unit 104 is operating normally, the power supply unit activates the PSU-STATUS signal by driving the signal to a non-zero voltage, such as, for example, five volts (5 V). If the power supply unit 104 is not receiving suitable input power INPWR, the power supply unit does not drive the status signal PSU-STATUS to the non-zero voltage, indicating the power supply unit is not operating normally.

The electronic circuit 106 also receives the status signal PSU-STATUS provided by the power supply unit 104 and generates a power supply control signal PSU-CONT to control the turning ON or activation of the power supply unit 104 and the turning OFF or deactivation of the power supply unit. A standby control circuit 108 receives the control signal PSU-CONT from the electronic circuit and generates a power supply activation signal PSU-ACT in response to the received control signal. The activation signal PSU-ACT is supplied to the power supply unit 104 to turn ON and OFF the power supply unit based on the control signal PSU-CONT provided by the electronic circuit 106.

The electronic circuit 106 utilizes the control signal PSU-CONT to control operation of the power supply unit 104 during operation of the electronic system 100. For example, upon detection of certain fault conditions in the electronic system 100 the electronic circuit 106 may deactivate the control signal PSU-CONT to thereby deactivate or turn OFF the power supply unit 104. The electronic circuit 106 may also alternately activate and deactivate the control signal PSU-CONT to alternately turn ON and OFF the power supply unit 104 during a power cycling mode of control of the power supply unit, as previously mentioned. For example, during power cycling mode of control the electronic circuit may alternately activate and deactivate the control signal PSU-CONT to turn ON the power supply unit 104 for a predetermined time and OFF for a predetermined time.

During the above described operation of controlling the activation and deactivation of the power supply unit 104, the standby control circuit 108 must activate the activation signal PSU-ACT to turn ON the power supply unit when the power supply unit is turned OFF. Thus, the standby control circuit 108 must continue to receive electrical power to operate even when the power supply unit 104 is turned OFF. For this reason, in conventional systems, the power supply unit must supply standby power to the standby control circuit 108 in this situation. In the electronic system 100 of FIG. 1, no such standby power from the power supply unit 104 needs to be provided. Instead, the power harvesting circuit 102 harvests electrical power from the status signal PSU-STATUS provided by the power supply unit 104 to generate a standby power signal SPS that is supplied to power the standby control circuit 108.

The power supply unit 104 always provides the status signal PSU-STATUS during normal operation of the power supply unit, meaning as long as the power supply unit receives suitable input power INPWR and is operating properly. Accordingly, during normal operation of the power supply unit 104 the power harvesting circuit 102 harvests electrical power from the status signal PSU-STATUS to generate the standby power signal SPS that is supplied to power the standby control circuit 108. In this way, the power harvesting circuit 102 eliminates the need for power supply unit 104 to provide standby power to the standby control circuit 108 when the power supply unit 104 is turned OFF during power cycling control, or other mode of control of the power supply unit where the power supply unit must be turned OFF and ON. As a result, less expensive power supply units 104 that do not provide standby power may be utilized in the electronic system 100.

Figure 2:
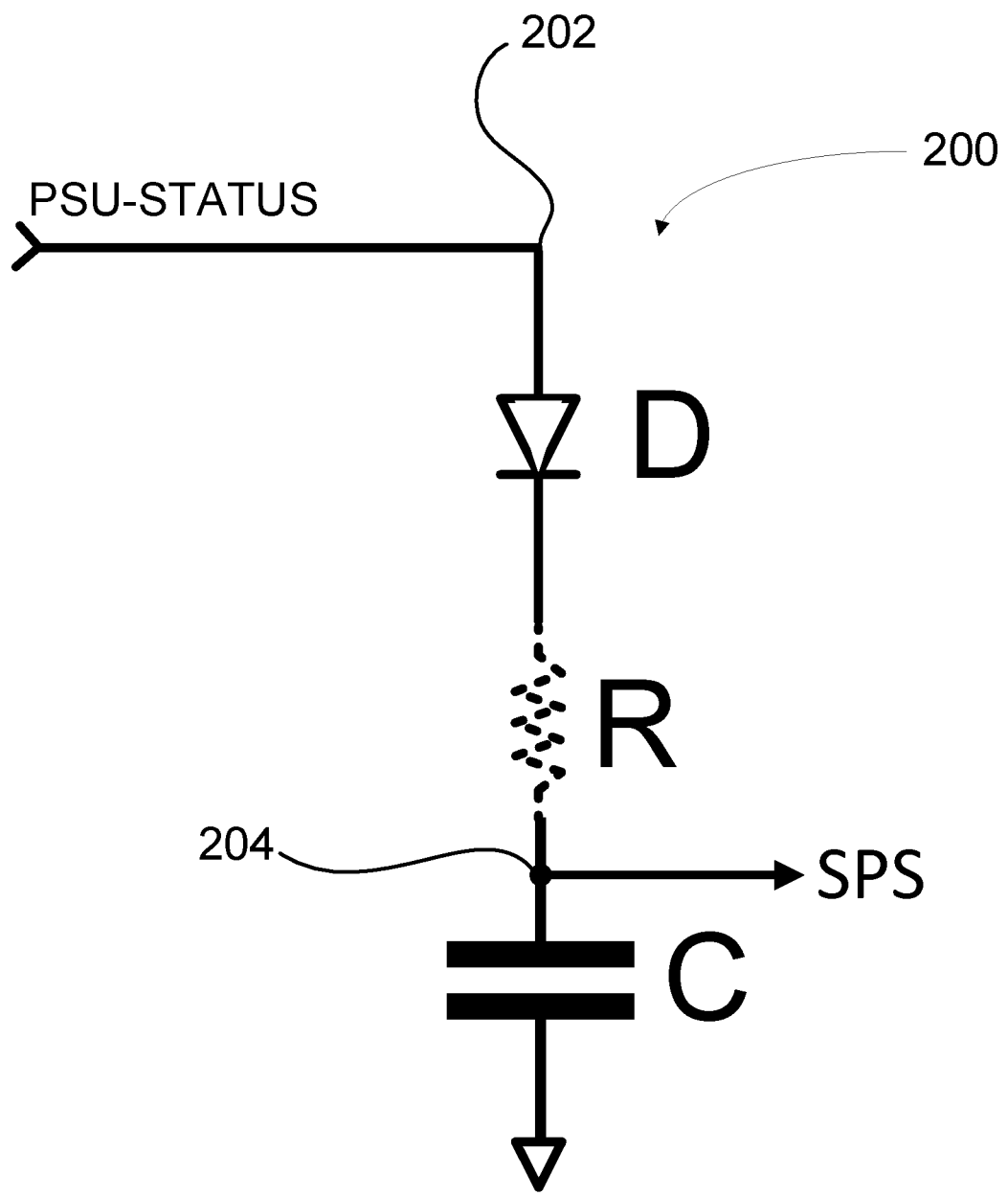
FIG. 2 is a schematic illustrating one embodiment of a standby power harvesting circuit according to an embodiment.

FIG. 2 is a schematic illustrating one embodiment of a standby power harvesting 200 circuit according to an embodiment. The standby power harvesting circuit 200 corresponds to one embodiment of the power harvesting circuit 102 of FIG. 1. In this embodiment, the power harvesting circuit 200 includes a current control device such as a diode D coupled between a status node 202 on which the status signal PSU-STATUS is provided by a power supply unit. The diode D is coupled between the status node 202 and a standby node 204 on which a standby power signal SPS is generated. A current-limiting device such as a resistor R may also be coupled in series with the diode D between the status node 202 and standby node 204. The current-limiting device is an optional component of the power harvesting circuit 200, which is represented in FIG. 2 by showing a dashed line for the resistor R. An energy storage element, which is a capacitor C in the example of FIG. 2, is coupled between the standby node 204 and a reference node of ground in this example embodiment.

In operation, the status signal PSU-STATUS has a non-zero voltage when the signal is active as previously described. Accordingly, in this situation a current initially flows from the status node 202 through the diode D to charge the capacitor C and thereby generate the standby power signal SPS on the standby node 204. The diode D allows current to flow to charge the standby node 204 and also prevents the status node 204 from discharging if the status signal PSU-STATUS is no longer active, such as could occur if the power supply unit (not shown) providing the status signal no longer receives a suitable input power as previously described for the power supply unit 104 of FIG. 1. In this situation, if a voltage on the status node 202 drops to a level lower than a level of the voltage on the standby node 204, the diode D prevents discharge of the standby node and thereby maintains the standby power signal SPS to power standby control circuitry (not shown) coupled to the standby node.

The power harvesting circuit 200 may include a current-limiting device as previously mentioned, where this current-limiting device is a resistor R in the embodiment of FIG. 2. The current-limiting device may be useful where a maximum current that may be drawn from the status node 202 is relatively small, and in this situation could help prevent damaging the power supply unit (not shown) supplying this current by drawing too much current from the status node when the capacitor C initially has no charge. In addition, even where drawing current from the status node 202 may not result in damage to the power supply unit supplying current on the status node, the current-limiting device limits the current drawn so that a voltage of the PSU-STATUS signal on the status node does drop below, or too far below, the desired value of the non-zero voltage for the PSU-STATUS signal.

The power harvesting circuit 200 is one example embodiment of a power harvesting circuit according to embodiments of the present disclosure, and other circuitry may be utilized to form a power harvesting circuit according to further embodiments. Furthermore, the current control device in the power harvesting circuit 200, as well as in other embodiments of power harvesting circuits according to the present disclosure, is not limited to being formed by a diode D. Other suitable circuits, such as a diode-coupled transistor or other unidirectional current devices may be utilized in place of the diode D to allow current to flow from the status node 202 to the standby node 204 while preventing current from flowing in the reverse direction from the standby node to the status node. The current-limiting device is similarly not limited to being formed by a resistive element, but may be any suitable element for limiting a maximum value of current flowing from the status node 202 to the standby node 204 during charging of the standby node.

Figure 3:
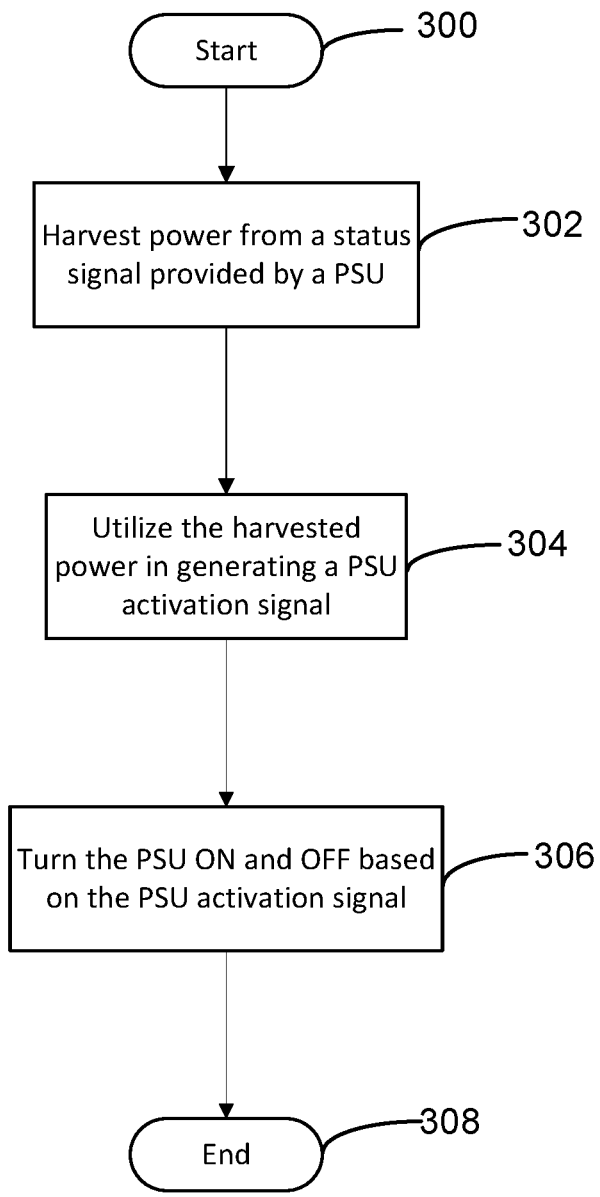
FIG. 3 is a flowchart showing a power harvesting process enabling activating and deactivating control of a power supply unit according to an embodiment.

FIG. 3 is a flowchart showing a power harvesting process enabling activating and deactivating control of a power supply unit according to an embodiment. In this embodiment, the process starts at 300 and proceeds immediately to 302 in which electrical energy is harvested from a status signal provided by a power supply unit. At 304, the harvested electrical energy from the status signal is utilized in generating a power supply 25 activation signal to control turning ON and OFF the power supply unit providing the status signal. From 304 the process proceeds to 306 and the power supply activation signal is utilized to control activation and deactivation of the power supply unit providing the status signal. The process then proceeds to 308 and terminates. The electronic system 100 of FIG. 1 illustrates an example of the operation of this process at 304 and 306, with the 30 harvested power from the power harvesting circuit 102 powering the standby control circuit 108 which, in turn, utilizes this harvested power in generating the activation signal PSU-ACT that is supplied to control activation and deactivation of the power supply unit 104.

Figure 4:
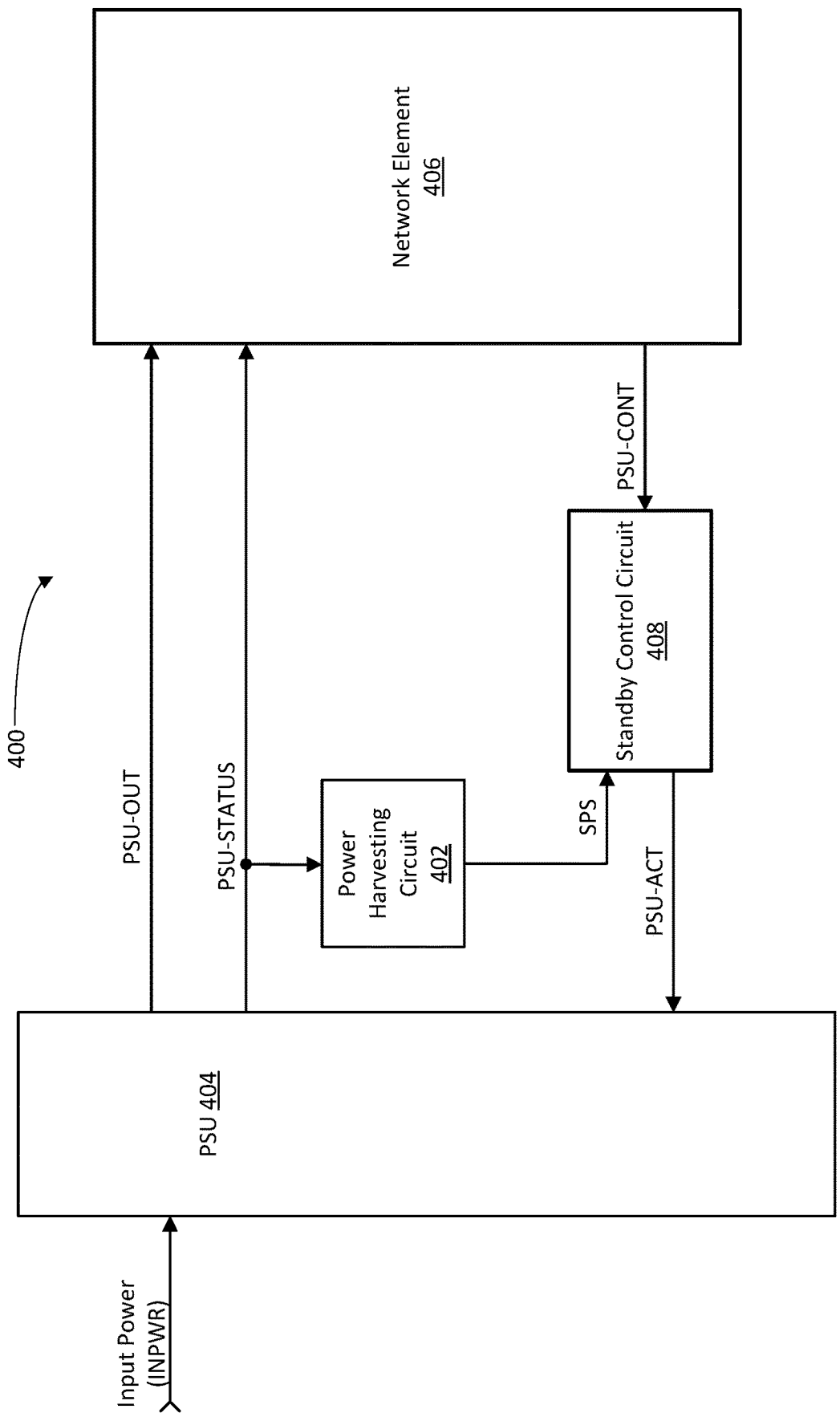
FIG. 4 is a functional block diagram of an electronic system including a network element, power supply unit and standby power harvesting circuit according to an embodiment.

FIG. 4 is a functional block diagram of an electronic system 400 including a power harvesting circuit 402, network element 406 and standby control circuit 408 according to an embodiment. In this embodiment, the operation of the power harvesting circuit 402 and standby control circuit 408 are the same as, or similar to, the corresponding circuits 102 and 108 of FIG. 1, and will accordingly not again be described in detail. The network element 406, which may be a network switch or router, for example, includes circuitry (not shown) for providing the power supply control signal PSU-CONT that controls activation and deactivation of the power supply unit 404 through the standby control circuit 408.

In one embodiment, the power supply status signal PSU-STATUS along with the power supply control signal PSU-CONT and power supply activation signal PSU-ACT have voltages of 3.3 volts. These signals may of course have other voltage levels, such as 5 volts, 2.5 volts, or 1.8 volts in further embodiments of the present disclosure. In some embodiments, the output power PSU-OUT has a voltage of either 54 volts or 12 volts. While the PSU 404 is active, in some embodiments the PSU supplies power for the activation signal PSU-ACT. In these embodiments, the voltage level of the power from the PSU 404 on the node on which the PSU-ACT signal is provided may have different voltage levels, with the standby control circuit 408 controlling the voltage level of the PSU-ACT signal by draining current or not draining current from this node on which the PSU-ACT signal is provided.

In some embodiments, the power harvesting circuit 402 harvests or stores enough electrical energy from this PSU-STATUS signal to supply approximately 100 microwatts (uW) to power the standby control circuit 408. The standby power signal SPS supplied by the power harvesting circuit 402 in one embodiment has a voltage of approximately 3 volts and a current of approximately 30 µA to supply the standby control circuit 408 with approximately 100 p.W of power. In the standby power harvesting circuit 200 of FIG. 2, the capacitor C in one embodiment has a value of approximately 120 pF. The capacitor C must store enough energy to provide the SPS signal to power standby control circuit 408 so that the standby control circuit maintains the PSU-ACT signal at a valid or true voltage level when the PSU 404 momentarily loses input power INPWR. Where the input power INPWR is a 50 Hz signal the standby control circuit 408 must therefore maintain the PSU-ACT signal 30 active for at least 10 milliseconds (i.e., one half cycle of the 50 Hz power signal). A value of 120 µF for the capacitor C enables the standby control circuit to drive the PSU-ACT signal active for more than one (1) second.

In some embodiments, the standby control circuit 408 generates the activation signal PSU-ACT during the power cycling mode of control to turn OFF the PSU 104 for one to four (1 to 4) seconds. Recall, the standby control circuit 408 generates the PSU-ACT signal based on the control signal PSU-CONT provided by the network element 406, as described above for the electronic circuit 106 in the embodiment of FIG. 1. During the power cycling mode of control, the ON time of the PSU 404 can be indefinite and last until a user decides to implement the power cycling mode of control, or an event like a loss of the input power INPWR supplied to the PSU 404 occurs. In the power cycling mode of control or operation, the OFF time (i.e., the time for which the PSU 404 is turned OFF via the PSU-ACT signal) must be long enough to sufficiently discharge components in the network element 406, but not long enough to indicate a failure of the PSU 404 to a user of the network element 406. As already mentioned, in one embodiment the OFF time is approximately 1-4 seconds. In this embodiment the network element 406 drives the PSU-CONT signal inactive for 1-4 seconds to initiate the power cycling mode of operation, causing the standby control circuit 408, in response to the PSU-CONT signal going inactive, to drive the PSU-ACT signal inactive for 1-4 seconds. After the inactive period of 1-4 seconds, the standby control circuit 408 drives the PSU-ACT signal active to again turn ON the PSU 404.

In the embodiments of FIGS. 1 and 4, the power harvesting circuits 102, 402 and the standby control circuits 108, 408 are shown as being separate components from the electronic circuits 106, 406. In other embodiments, one or both of the power harvesting circuit 102, 402 and standby control circuit 108, 408 may be included in the corresponding electronic circuit 106, 406. Furthermore, in other embodiments a portion of the circuitry forming the power harvesting circuit 102, 402 may be contained within the electronic circuit 106, 406 and a portion of the circuitry may be external to the electronic circuit. For example, referring back to FIG. 2, where the power harvesting circuit 200 includes a capacitor C for storing electrical energy harvested from the status signal PSU-STATUS, the diode D and resistor R, if included, may be contained in the electronic circuits 106, 406 while the capacitors C are external to these electronic circuits.

The various features and processes described above may be used independently of one another or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

ADDITIONAL EXAMPLES

Each of the following non-limiting examples may stand on its own, or may be combined in various permutations or combinations with one or more of the other examples.

Example 1 is a system, comprising: a power supply unit configured to provide an output power and a supply status indicating whether the power supply unit is receiving input power; an electronic circuit coupled to the power supply unit to receive the output power; a standby control circuit configured to control turning on and off the power supply unit; and a power harvesting circuit configured to generate standby power from the supply status and to provide the standby power to power the standby control circuit.

Example 2 is the subject matter of Example 1, wherein the power harvesting circuit comprises a storage element to store electrical energy from the supply status.

Example 3 is the subject matter of any one or more of Examples 1-2, wherein the storage element comprises a capacitive circuit.

Example 4 is the subject matter of any one or more of Examples 1-3, wherein the power supply unit provides a supply status signal indicating the supply status on a status output, and wherein the power harvesting circuit comprises: a current-control circuit having a first node coupled to the status output and a second node coupled to a standby power node coupled to the standby control circuit, the current-control circuit configured to allow current to flow from the status output to the standby power node and to block current from flowing from the standby power node to the status output; and a capacitive circuit coupled between the standby power node and a reference node.

Example 5 is the subject matter of any one or more of Examples 1-4, wherein the current-control circuit comprises a diode having an anode coupled to the status output and a cathode coupled to the standby power node.

Example 6 is the subject matter of any one or more of Examples 1-5, wherein the power harvesting circuit further comprises current-limiting circuitry coupled between the first node and the second node of the current-control circuit, the current-limiting circuitry configured to limit a maximum current flowing from the status output to the standby power node.

Example 7 is the subject matter of any one or more of Examples 1-6, wherein the current-limiting circuitry comprises a resistive circuit.

Example 8 is the subject matter of any one or more of Examples 1-7, wherein the electronic circuit comprises a network switch.

Example 9 is the subject matter of any one or more of Examples 1-8, wherein the standby control circuit and at least a portion of the power harvesting circuit are contained in the electronic circuit.

Example 10 is the subject matter of any one or more of Examples 1-9, wherein the electronic circuit is configured to generate a first control signal indicating whether the power supply unit is to be activated or deactivated, and wherein the standby control circuit is configured, in response to the first control signal, to generate a second control signal that is supplied to the power supply unit to activate or deactivate the power supply unit.

Example 11 is the subject matter of any one or more of Examples 1-10, wherein the electronic circuit generates the first control signal to alternately activate the power supply unit for first time and deactivate the power supply unit during a power cycle mode of operation.

Example 12 is a system, comprising: an electronic circuit configured to receive output power from a power supply unit; a standby control circuit configured to control activating and deactivating the power supply unit; and a power harvesting circuit configured to receive a status output from the power supply unit indicating whether the power supply unit is receiving input power, and to generate standby power from the status output and provide the standby power to the standby control circuit.

Example 13 is the subject matter of Example 12, wherein the status output comprises a status output signal and wherein power harvesting circuit comprises a storage element to store electrical energy from the status output signal.

Example 14 is the subject matter of any one or more of Examples 12-13, wherein the storage element comprises a capacitive circuit.

Example 15 is the subject matter of any one or more of Examples 12-14, wherein the status output signal is supplied on a status output node and the standby control circuit includes a standby power node, and wherein the power harvesting circuit comprises current control circuitry coupled between the status output node and the standby power node, the current control circuitry configured to allow current on the status output node to charge the standby power node to generate a standby voltage on the standby power node that supplies power to the standby control circuit.

Example 16 is the subject matter of any one or more of Examples 12-15, wherein the current control circuitry comprises a unidirectional current control device that allows current to flow from the status output node to the standby power node and blocks current from flowing from the standby power node to the status output node.

Example 17 is a method, comprising: harvesting power from a status output provided by a power supply unit, the status output indicating if the power supply unit is receiving valid input power; utilizing the harvested power in generating a power supply unit activation signal, the power supply unit activation signal having a first value indicating the power supply unit is to be turned ON and a second value indicating the power supply unit is to be turned OFF; and turning ON and OFF the power supply unit based on the power supply unit activation signal.

Example 18 is the subject matter of Example 17, wherein harvesting power from the status output comprises charging a capacitive element.

Example 19 is the subject matter of any one or more of Examples 17-18, wherein turning ON and OFF the power supply unit comprises power cycling the power supply unit.

Example 20 is the subject matter of any one or more of Examples 17-19, wherein utilizing the harvested power in generating the power supply unit activation signal comprises supplying the harvested power to power a standby control circuit in the power supply unit.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

What is claimed is:

1. A system, comprising:
a power supply unit configured to provide an output power and a supply status signal voltage indicating whether the power supply unit is receiving input power during operation of an application;
an electronic circuit coupled to the power supply unit to receive the output power;
a standby control circuit configured to control turning on and off the power supply unit; and
a power harvesting circuit configured to harvest and store standby power from the supply status signal voltage and to provide the standby power to power the standby control circuit,
wherein the electronic circuit is configured to generate a first control signal indicating whether the power supply unit is to be activated or deactivated, and wherein the standby control circuit is configured, in response to the first control signal, to generate a second control signal that is supplied to the power supply unit to activate or deactivate the power supply unit,
wherein the standby control circuit generates and supplies the second control signal by way of the harvested and stored standby power to alternately activate the power supply unit for a first predetermined time and deactivate the power supply unit for a second predetermined time of approximately 1-4 seconds during a power cycle mode of operation required by the electronic circuit being powered by the power supply unit, and
wherein the electronic circuit being powered by the power supply unit receives no standby power when the power supply unit is turned off.

2. The system of claim 1, wherein the power harvesting circuit comprises a storage element to store electrical energy from the supply status.

3. The system of claim 2, wherein the storage element comprises a capacitive circuit.

4. The system of claim 1, wherein the power supply unit provides a supply status signal indicating the supply status on a status output, and wherein the power harvesting circuit comprises:
a current-control circuit having a first node coupled to the status output and a second node coupled to a standby power node coupled to the standby control circuit, the current-control circuit configured to allow current to flow from the status output to the standby power node and to block current from flowing from the standby power node to the status output; and
a capacitive circuit coupled between the standby power node and a reference node.

5. The system of claim 4, wherein the current-control circuit comprises a diode having an anode coupled to the status output and a cathode coupled to the standby power node.

6. The system of claim 5, wherein the power harvesting circuit further comprises current-limiting circuitry coupled between the first node and the second node of the current-control circuit, the current-limiting circuitry configured to limit a maximum current flowing from the status output to the standby power node.

7. The system of claim 6, wherein the current-limiting circuitry comprises a resistive circuit.

8. The system of claim 1, wherein the electronic circuit comprises a network switch.

9. The system of claim 8, wherein the standby control circuit and at least a portion of the power harvesting circuit are contained in the electronic circuit.

10. A system, comprising:
an electronic circuit configured to receive output power from a power supply unit powering an electronic circuit;
a standby control circuit configured to control activating and deactivating the power supply unit; and
a power harvesting circuit configured to harvest energy associated with a status output voltage from the power supply unit indicating whether the power supply unit is receiving input power, and to store standby power from the status output voltage and provide the standby power to the standby control circuit to alternately activate the power supply unit for a first predetermined time and deactivate the power supply unit for a second predetermined time of approximately 1-4 seconds during a power cycle mode of operation required by the electronic circuit,
wherein the electronic circuit being powered by the power supply unit receives no standby power when the power supply unit is turned off.

11. The system of claim 10, wherein the status output comprises a status output signal and wherein power harvesting circuit comprises a storage element to store electrical energy from the status output signal.

12. The system of claim 11, wherein the storage element comprises a capacitive circuit.

13. The system of claim 11, wherein the status output signal is supplied on a status output node and the standby control circuit includes a standby power node, and wherein the power harvesting circuit comprises current control circuitry coupled between the status output node and the standby power node, the current control circuitry configured to allow current on the status output node to charge the standby power node to generate a standby voltage on the standby power node that supplies power to the standby control circuit.

14. The system of claim 13, wherein the current control circuitry comprises a unidirectional current control device that allows current to flow from the status output node to the standby power node and blocks current from flowing from the standby power node to the status output node.

15. A method, comprising:
harvesting and storing standby power from a status output voltage provided by a power supply unit powering an electronic circuit, the status output indicating if the power supply unit is receiving valid input power;
utilizing the harvested and stored standby power in generating a power supply unit activation signal, the power supply unit activation signal having a first value indicating the power supply unit is to be turned ON and a second value indicating the power supply unit is to be turned OFF; and
turning ON and OFF the power supply unit based on the power supply unit activation signal,
wherein turning ON and OFF the power supply unit comprises power cycling the power supply unit required by the electronic circuit to alternatively activate the power supply unit for a first predetermined time and deactivate the power supply unit for a second predetermined time of approximately 1-4 seconds, wherein the electronic circuit being powered by the power supply unit receives no standby power when the power supply unit is turned OFF.

16. The method of claim 15, wherein harvesting power from the status output comprises charging a capacitive element.

17. The method of claim 15, wherein utilizing the harvested power in generating the power supply unit activation signal comprises supplying the harvested power to power a standby control circuit in the power supply unit.

18. The method of claim 15, wherein utilizing the harvested and stored standby power is performed by a current-control circuit comprising a diode having an anode coupled to the status output and a cathode coupled to a standby power node.

19. The method of claim 18, wherein the power harvesting circuit further comprises current-limiting circuitry coupled between a first node and a second node of the current-control circuit, the current-limiting circuitry configured to limit a maximum current flowing from the status output to the standby power node.

20. The method of claim 19, wherein the current-limiting circuitry comprises a resistive circuit.

* * * * *